United States Patent
Sacharnoski, Sr.

[11] 3,988,851
[45] Nov. 2, 1976

[54] FISHING LURE SOUND PRODUCER

[76] Inventor: Max Sacharnoski, Sr., 112 Glenwood Drive, Paducah, Ky. 42001

[22] Filed: June 6, 1972

[21] Appl. No.: 260,334

[52] U.S. Cl. .............................. 43/42.31; 43/42.24
[51] Int. Cl.² ......................................... A01K 85/00
[58] Field of Search ............ 43/42.31, 42.24, 42.53; 128/329, 272; 46/174, 191, 117

[56] References Cited
UNITED STATES PATENTS

| | | | |
|---|---|---|---|
| 1,024,259 | 4/1912 | Henderson | 128/272 |
| 2,718,725 | 9/1955 | Thurman | 43/42.31 |
| 2,778,143 | 1/1957 | Bratz, Sr. | 43/42.31 X |
| 2,778,157 | 1/1957 | Gratzer | 46/174 |
| 3,068,604 | 12/1962 | Nyberg | 43/42.31 X |
| 3,165,858 | 1/1965 | Rutter | 43/42.53 |
| 3,760,528 | 9/1973 | Moore | 43/42.24 |
| 3,802,115 | 4/1974 | Auten et al. | 43/42.31 |

FOREIGN PATENTS OR APPLICATIONS

| | | | |
|---|---|---|---|
| 985,088 | 3/1951 | France | 46/117 |

*Primary Examiner*—Louis G. Mancene
*Assistant Examiner*—Daniel J. Leach
*Attorney, Agent, or Firm*—Imirie, Smiley & Linn

[57] ABSTRACT

A capsule comprising a glass tube with closed ends contains a plurality of free spherical balls, preferably metal, for association with a fishing lure to produce clear, resonant sounds that attract fish to the lure without materially affecting the attitude of the lure or its course within or through the water.

1 Claim, 6 Drawing Figures

FISHING LURE SOUND PRODUCER

BACKGROUND OF THE INVENTION

1. Field of the Invention:

The present invention generally appertains to new and novel improvements in fishing lures and is particularly directed to a new and novel sound producing fishing lure, and especially to new and novel sound producing means which may be imbedded in or otherwise attached to any type or nature of fishing lure so as to transform the lure into a sound producer that rattles and emits fish enticing and attracting sounds.

2. State of the Prior Art:

There are many fishing lures known in the prior art, such as U.S. Pat. Nos. 2,659,176; 2,738,610 and 3,044,207 for example, wherein the body of the lure contains or has associated therewith one or several metal balls or similar elements. Such balls or elements are provided for the purpose of rolling around and shifting weight, thereby causing the lure body to effect various movements as it is drawn or moved through the water. These movements are executed to simulate movements of live bait, and attract fish to the lure. The balls also function as a sinker, controlling the level at which the lure is moved through the water.

Incidental to the production of wobbling, undulating and other erratic attitude and course or depth control movements by the lure, the metal balls sometimes may create vibrations but such vibrations are so slight that they do not produce fish attracting sounds. No sound of any appreciable loudness or fish enticing pitch or quality is produced by the balls striking each other or the body of the lure or the container in which they are housed, either within or in attachment to the lure body.

SUMMARY OF THE INVENTION

The present invention comprises a simple and inexpensive sound producing means that is adapted to be easily and effectively attached to or embedded in the body of a fishing lure of any type or nature, for the purpose of producing clear, resonant sounds within the water as the lure is moved through the water, whereby fish are attracted to the lure. The invention also encompasses a rattling fishing lure that contains within its body a sound producing means that creates clear, resonant, clicking sounds so as to entice fish to the lure without materially affecting the attitude of the lure or its position or course within or through the water.

In accordance with the present invention, a plurality of small spherical bodies, such as metal balls or shot, are housed within a glass capsule. The capsule preferably is in the form of a small elongated glass tube that has closed ends. Preferably, the tubular capsule is drawn from hard glass tubing, such as commercially available Pyrex glass. The shot containing tube may be attached to or embedded within the body of a lure of any type or nature in a way so that it has no material affect on the movements of the lure within the water, but so that the balls produce a clear, resonant clicking sound that has a decided and sufficient loudness, pitch and quality of a character to attract fish to the lure.

The use of glass is of importance not only due to the fact that such material is corrosion resistant and is easy and inexpensive to work with in the fabricating of the ball containing capsule but also because the glass, due to the physical characteristics and properties thereof, creates louder and clearer sounds with greater fish enticing pitch and quality than would be realizable with metal, plastic or other materials. In one example, conventional Pyrex glass tubing was drawn to a tube wall thickness of about ¼ to ½ mm. with an O.D. of 3 to 4 mm. The tubing was severed to produce small tubes. The resultant tubes are ½ to ¾ inches in length and enclose a plurality of No. 8 or No. 9 shot, the ends of the tubes being sealed as by heating and crimping. While Pyrex glass is preferred, any hard glass is suitable because not only is it more rugged but also produces greater sound than so-called soft glass.

In the instance of lures with solid bodies, such as plugs, a hole or bore is drilled in the body to a depth and of a diameter sufficient to accommodate the capsule which is completely inserted into the hole. The capsule is sealed in the hole by closing off the hole with a caulking compound, plug or the like. In the instance, for example, of lures having a flexible and/or resilient body, such as lures simulative of a worm or eel, a capsule may be embedded when the lure is molded but if not, a hole can be started in the body by a sharp piercing instrument and the capsule, with its crimped pointed ends, pushed one end first into the starter hole until the capsule is completely surrounded by and housed within the body. The body is squeezed over the capsule to close the hole over the capsule and seal the capsule within the body. Obviously, the capsule may be secured externally of the lure body by a suitable water resistant adhesive or binding such as pressure sensitive tape.

DETAILED DESCRIPTION OF THE INVENTION

Figure 1:
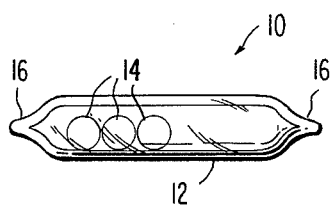
FIG. 1 is a view in elevation of a sound producing capsule according to the present invention and showing the glass envelope with shot housed therein.

Referring now more particularly to the accompanying drawings and initially to FIG. 1, the present invention comprises a sound producing means 10 which is illustrated as including a capsule in the form of a small elongated glass tube 12. The tubular capsule 12 is formed from glass and, preferably, from a hard strengthened glass tubing, such as commercially available Pyrex glass. Pyrex or similar hard glass tubing or the like artificial or natural substance having similar properties is drawn to produce the tubular capsule 12 which has, in the preferred form, a wall thickness on the order of ¼ to ½ mm. with an O.D. of 3 to 4 mm.

The tubular capsule 12 is generally of a length of about ½ to ¾ inch and encloses several spherical metal balls or elements 14, preferably, No. 8 or 9 shot. The open ends of the tubular capsule are closed, normally heated and crimped together, so as to enclose the elements 14 and to form sealed opposing ends 16, preferably somewhat pointed, on the tubular capsule 12. As can be appreciated from a consideration of FIG. 1, the spherical balls or shot 14 are relatively free for individual movement relative to each other and for collective and singular movement with respect to the inner surfaces of the closure walls of the tubular capsule 12.

The capsule 12 is fabricated from glass because of the fact that glass is completely stable in the water and wet air environment that a fishing lure occupies. In this respect, the glass is corrosion resistant. In addition, glass is easier to work with in the fabrication and production of the tubular capsules and, also, is less expensive. Furthermore, there is a quality control factor, since the sealing of the glass tube 12 at its ends, for example, is straightforward and the necessary freedom of movement of the shot or balls 14 is discernible through the transparent glass capsule at a glance without any type of additional testing being required.

However, the primary purpose for employing glass in the fabricating of the tubular capsule 12 resides in the fact that the balls or shot 14 moving within the glass capsule and contacting each other and the walls of the capsule set up vibrations in the glass capsule to produce a clear, resonant clicking sound that has a decided and sufficient loudness and a particular pitch and quality of a character to attract fish to a lure employing the capsule.

Pyrex or similar glass or any artificial or natural substance having similar properties in composition is employed because it has a high comprehensive stress factor and can withstand greater contact and repeated impact by the hard balls or elements 14 without any tendency of breakage.

It is believed that due to the fact that the commercial glass is constituted by mixtures of silicates, the capsule body 12 gives off a particular amplitude or extent of vibrations and creates particular sound waves that have a specially enticing or attractive quality in drawing fish to a fishing lure carrying a capsule. The glass tube or capsule 12 sends off vibrations that are communicated through the surrounding liquid medium and are propagated in the form of waves that strike the fish and cause the fish to be attracted to the lure body.

The tubular glass capsule 12, with the contained freely rolling balls or shot 14, is adapted to be embedded in or attached to any type of lure. Due to the extremely light weight of the capsule and its contained balls or shot, it does not have any material effect upon the attitude of the lure or its position or course within or through a body of water. Thus, the shot housed within the tubular capsule does not materially weight or ballast the lure, regardless of the type or nature thereof, and does not produce any erratic or wobbling or similar movements of the lure body as it is drawn through the water. In point of fact, the sound producing means 10 has no material effect upon the movements, position or course of the lure body, regardless of the type or nature thereof. This is due to the extremely small size of the ball elements or shot in relation to the overall size of the lure.

Figure 2:
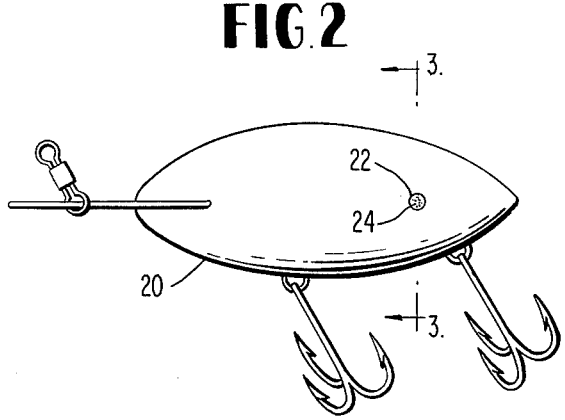
FIG. 2 is a side elevational view of one type of solid body lure embodying the present invention.
Figure 3:
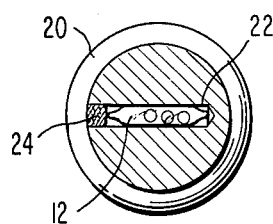
FIG. 3 is a vertical cross-sectional view taken substantially on line 3—3 of FIG. 2.

In the instance of a solid body lure, such as the plug lure 20, FIGS. 2 and 3, a bore or hole 22 is drilled or otherwise formed in the lure body in any particular way and to a sufficient length and of a proper diameter to snugly receive the tubular capsule 12 which is housed therein. The tubular capsule 12 is fitted within the hole 22 and the open end of the hole is sealed by any suitable caulking compound or plug 24. While the hole 22 is shown in connection with the lure body 20 of FIGS. 2 and 3 as being drilled radially in the lure body, it is obvious that the hole can be drilled longitudinally or at any angular relation or placement relative to the lure body since the capsule and the contained shot will have no material effect upon the ballast, attitude or movements of the lure body.

Figure 4:
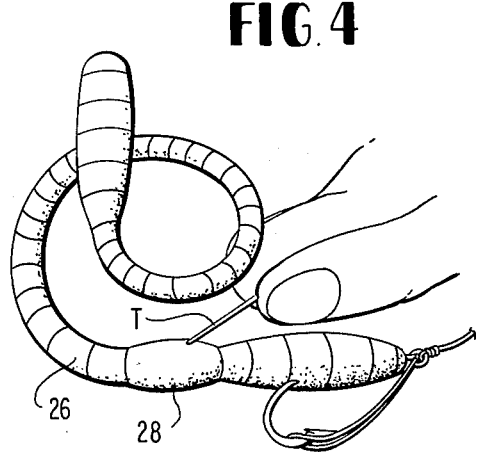
FIG. 4 is a perspective view of a solid, flexible body type lure, simulative of a worm.
Figure 5:
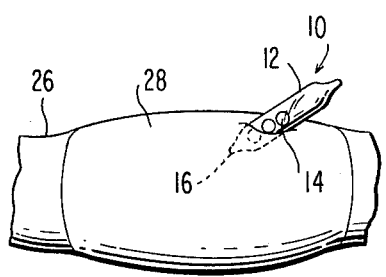
FIGS. 5 and 6 are enlarged fragmentary views of a portion of the lure body shown in FIG. 4 having a capsule, according to the invention, inserted therein.
Figure 6:
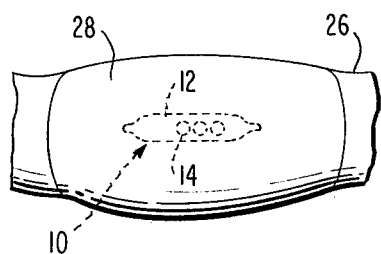

In the instance of a lure which has a flexible and/or resilient body, such as a worm lure 26, FIGS. 4–6, wherein the lure is similative of a worm or the like, the tubular shot containing capsule 12 is embedded during molding of the lure or it may be forced into and embedded within any selected part of the body after the latter is formed. For example, a sharp or pointed tool T can be forced into an enlarged center portion 28 of the body 26, FIG. 4, to form a starter hole. Thereafter, the tubular capsule 12 is forced into the starter hole by one of its ends 16, FIG. 5, enabling it to be easily pushed into and form its own opening within the body portion 28 until the capsule is entirely surrounded by the body portion 28, FIG. 6, whereupon the outer portion of the body portion is squeezed over the hole so as to close the hole and seal the capsule within the body. If the capsule ends 16 are pointed, insertion of the capsule is facilitated. Despite the lack of weight of the capsule, its weight does assist in sinking a lightweight lure of the worm type for fishing in deeper water, particularly for bass.

While the capsule 12 has been illustrated as being in the form of a tube, it is quite obvious that it can be of any shape, such as a rectangular, square, shallow envelope or any other geometrical shape or configuration, from a plane or cross-sectional standpoint. The capsule is formed from glass and contains enough free-rolling shot or similar elements so that the same can contact each other and the inner surfaces of the capsule to produce the clicking sounds. The sounding elements may be the balls or shot 14 but any other elements of sufficient hardness can be utilized. While it is not essential that the elements be spherical, such shape is preferred because the elements will always be freely rolling or moving. Such unrestricted movement of the elements is of importance.

The sound producing device 10 has been shown in association with only two particular types of lures but it is obvious that such is merely exemplary of the nature and adaptability of the sound producing means and the lures may be of any type or nature, as will be understood by those skilled in the art. Also, in this respect, while the sound producing device, in the form of the glass capsule 12 with the contained balls or shot 14, has been shown embedded in the lure bodies, such can and may, in the instances of some forms of lures, be attached to the exterior of a lure body. For example, a capsule may be tied or otherwise secured in a fly type lure.

I claim:

1. A sound maker for a soft bodied fishing lure comprising an elongated tubular glass capsule, at least one of the ends of said capsule being pointed to facilitate forcing the capsule into the soft lure body for embedment therein, and a plurality of metal, spherical balls freely disposed in and contained by the capsule said balls being sized to rattle against the inner wall of said capsule producing a clear, resonant sound that will attract fish, the inner-diameter of said capsule being slightly larger than the diameter of said spherical balls such that the balls are disposed in a line within the capsule.

* * * * *